(12) United States Patent
Laukkanen et al.

(10) Patent No.: US 9,797,093 B2
(45) Date of Patent: Oct. 24, 2017

(54) METHOD FOR PRODUCING NANOFIBRILLAR CELLULOSE

(71) Applicant: UPM-KYMMENE CORPORATION, Helsinki (FI)

(72) Inventors: Antti Laukkanen, Helsinki (FI); Markus Nuopponen, Helsinki (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 14/440,255

(22) PCT Filed: Nov. 1, 2013

(86) PCT No.: PCT/FI2013/051039
§ 371 (c)(1),
(2) Date: May 1, 2015

(87) PCT Pub. No.: WO2014/068196
PCT Pub. Date: May 8, 2014

(65) Prior Publication Data
US 2015/0299955 A1    Oct. 22, 2015

(30) Foreign Application Priority Data
Nov. 3, 2012 (FI) .................................... 20126148

(51) Int. Cl.
*D21H 11/18* (2006.01)
*C08L 1/04* (2006.01)
(Continued)

(52) U.S. Cl.
CPC ............ *D21H 11/18* (2013.01); *C08B 15/00* (2013.01); *C08B 15/02* (2013.01); *C08B 15/04* (2013.01);
(Continued)

(58) Field of Classification Search
CPC .......... D21H 1/18; D21H 11/20; D21H 11/16; D21H 17/25; D21C 9/007; D21C 9/001;
(Continued)

(56) References Cited

U.S. PATENT DOCUMENTS 3,938,782 A * 2/1976 Robertson ............. D21F 11/002
366/101
4,374,702 A * 2/1983 Turbak ..................... D01D 5/11
162/100
(Continued)

FOREIGN PATENT DOCUMENTS

CA    2849750    *    4/2013
EP    2226414 A1    9/2010
(Continued)

OTHER PUBLICATIONS

Besbes et al., "Nanofibrillated Cellulose from TEMPO-oxidized Eucalyptus Fibres: Effect of the Carboxyl Content," Carbohydrate Polymers, vol. 84, 2011, pp. 975-983.
(Continued)

*Primary Examiner* — Eric Hug
(74) *Attorney, Agent, or Firm* — Nixon Peabody LLP

(57) ABSTRACT

In a method for preparing nanofibrillar cellulose, fibrous dispersion of ionically charged cellulose is repeatedly passed through a mechanical process of disrupting fibers into fibrils until the viscosity starts to decrease. The number average diameter of the nanofibrillar cellulose after the mechanical process is in the range of 2-10 nm, and the zero-shear viscosity is below 10 Pa·s, preferably below 1 Pa·s, when measured in the concentration of 0.5 wt-%. The nanofibrillated cellulose is low aspect ratio nanofibrillated cellulose (NFC-L).

34 Claims, 4 Drawing Sheets

(51) Int. Cl.
| | |
|---|---|
| *D21C 9/00* | (2006.01) |
| *C08B 15/04* | (2006.01) |
| *D21B 1/02* | (2006.01) |
| *D21H 11/16* | (2006.01) |
| *D21H 11/20* | (2006.01) |
| *C08B 15/00* | (2006.01) |
| *C08B 15/02* | (2006.01) |

(52) U.S. Cl.
CPC ............... *C08L 1/04* (2013.01); *D21B 1/021* (2013.01); *D21C 9/007* (2013.01); *D21H 11/16* (2013.01); *D21H 11/20* (2013.01)

(58) Field of Classification Search
CPC ........... D21C 9/00; C08B 15/00; C08B 15/04; C08B 15/02; C08B 5/00; C08L 1/02; C08L 1/04; C08L 2205/16; D21B 1/021; D21B 1/00; D21B 1/02; D21B 1/04; D21B 1/12; D21B 1/38
USPC ............ 162/23, 28, 56, 57, 59, 157.6, 157.7
See application file for complete search history.

(56) References Cited

U.S. PATENT DOCUMENTS

| | | | | |
|---|---|---|---|---|
| 4,481,076 A * | 11/1984 | Herrick | .................. | D21C 9/002 162/100 |
| 4,481,077 A * | 11/1984 | Herrick | .................. | D21C 9/001 162/100 |
| 5,964,983 A * | 10/1999 | Dinand | .................. | C09K 8/206 162/187 |
| 6,183,596 B1 * | 2/2001 | Matsuda | ................. | D21C 9/007 162/100 |
| 6,214,163 B1 * | 4/2001 | Matsuda | ................. | D21C 9/007 162/100 |
| 6,224,663 B1 * | 5/2001 | Cantiani | ............... | A23L 1/0534 106/162.8 |
| 6,602,994 B1 | 8/2003 | Cash et al. | | |
| 7,381,294 B2 * | 6/2008 | Suzuki | ..................... | D21D 1/20 162/102 |
| 8,710,213 B2 * | 4/2014 | Zhu | ........................... | C08B 5/00 536/56 |
| 8,871,056 B2 * | 10/2014 | Gane | ...................... | B82Y 30/00 162/181.1 |
| 8,871,057 B2 * | 10/2014 | Gane | ...................... | D21B 1/16 162/181.1 |
| 8,945,346 B2 * | 2/2015 | Bjoerkqvist | ............. | D21D 1/20 162/187 |
| 9,315,942 B2 * | 4/2016 | Nuopponen | ............ | D21H 17/66 |
| 2008/0060774 A1 * | 3/2008 | Zuraw | .................. | C09D 101/00 162/135 |
| 2011/0198533 A1 | 8/2011 | Nachtkamp et al. | | |
| 2012/0043039 A1 * | 2/2012 | Paltakari | ................ | D21H 11/18 162/157.6 |
| 2012/0094953 A1 * | 4/2012 | Gane | ........................ | D21B 1/16 514/57 |
| 2012/0107480 A1 * | 5/2012 | Gane | ...................... | B82Y 30/00 426/573 |
| 2012/0132383 A1 * | 5/2012 | Laine | ...................... | D21H 11/18 162/175 |
| 2012/0227633 A1 * | 9/2012 | Laukkanen | ............. | C04B 18/24 106/805 |
| 2012/0277351 A1 * | 11/2012 | Yano | ...................... | D21H 11/18 524/35 |
| 2012/0316330 A1 * | 12/2012 | Zhu | ....................... | B82Y 40/00 536/56 |
| 2013/0000855 A1 * | 1/2013 | Nuopponen | ........... | D21H 11/18 162/76 |
| 2013/0126112 A1 * | 5/2013 | Gane | ..................... | D21C 9/007 162/141 |
| 2013/0180680 A1 * | 7/2013 | Axrup | ..................... | D21H 17/24 162/177 |
| 2013/0303750 A1 * | 11/2013 | Zhu | .......................... | C08B 5/00 536/59 |
| 2013/0345416 A1 * | 12/2013 | Laukkanen | .......... | B01J 13/0069 536/85 |
| 2014/0083634 A1 * | 3/2014 | Bjoerkqvist | .............. | D21D 1/20 162/28 |
| 2014/0124150 A1 * | 5/2014 | Sabourin | ................ | D21C 9/001 162/9 |
| 2014/0130710 A1 * | 5/2014 | Laukkanen | .......... | C09D 101/02 106/203.3 |
| 2014/0378676 A1 * | 12/2014 | Lauraeus | ............... | C12N 15/10 536/25.4 |
| 2015/0072902 A1 * | 3/2015 | Lafitte | .................... | C09K 8/035 507/112 |
| 2015/0090412 A1 * | 4/2015 | Sabourin | ................ | D21C 9/001 162/9 |
| 2015/0167249 A1 * | 6/2015 | Ono | ........................ | B32B 29/02 162/130 |
| 2015/0299955 A1 * | 10/2015 | Laukkanen | ............. | C08B 15/00 162/9 |
| 2015/0322170 A1 * | 11/2015 | Haggblom | ................. | C08L 1/02 536/56 |
| 2015/0322171 A1 * | 11/2015 | Tienvieri | ................ | C08B 15/04 428/401 |
| 2015/0330024 A1 * | 11/2015 | Gane | ...................... | D21C 9/007 162/149 |
| 2015/0367024 A1 * | 12/2015 | Laukkanen | ............. | A61L 15/28 424/444 |
| 2016/0122947 A1 * | 5/2016 | Kajanto | ................. | D21H 11/20 162/146 |

FOREIGN PATENT DOCUMENTS

| | | | | |
|---|---|---|---|---|
| FI | WO 2012107643 A2 * | 8/2012 | ............. | B82Y 30/00 |
| FI | WO 2014068196 A3 * | 6/2014 | ............. | C08B 15/00 |
| FI | WO 2015011337 A1 * | 1/2015 | ............. | C08B 15/04 |
| FI | WO 2015150620 A1 * | 10/2015 | ............... | D21D 1/20 |
| JP | 2008-001728 A | 1/2008 | | |
| JP | 2009-161893 A | 7/2009 | | |
| JP | WO 2009084566 A1 * | 7/2009 | ............. | C08B 15/02 |
| JP | 2009-298972 A | 12/2009 | | |
| JP | 2010-235679 A | 10/2010 | | |
| JP | 2010-236109 A | 10/2010 | | |
| JP | 2012-214943 A | 11/2012 | | |
| NO | WO 2015180844 A1 * | 12/2015 | ............... | D21D 1/20 |
| SE | WO 2008056989 A2 * | 5/2008 | ............. | B82Y 30/00 |
| WO | 2007/001229 A1 | 1/2007 | | |
| WO | WO 2009/084566 A1 | 7/2009 | | |
| WO | WO 2009/122982 | 10/2009 | | |
| WO | WO 2010/116826 | 10/2010 | | |
| WO | 2011/064441 A1 | 6/2011 | | |
| WO | WO 2011/074301 | 6/2011 | | |
| WO | WO 2011/118746 A1 | 9/2011 | | |
| WO | WO 2012/017160 | 2/2012 | | |
| WO | 2012/043103 A1 | 4/2012 | | |
| WO | 2012/107643 A2 | 8/2012 | | |
| WO | WO 2012/107643 | 8/2012 | | |
| WO | 2012/119229 A1 | 9/2012 | | |

OTHER PUBLICATIONS

Aug. 26, 2013 Office Action and Search Report issued in Finnish Application No. 20126148.

May 8, 2014 International Search Report issued in Application No. PCT/FI2013/051039.

May 8, 2014 Written Opinion issued in Application No. PCT/FI2013/051039.

Nov. 10, 2014 Written Opinion issued in Application No. PCT/FI2013/051039.

Feb. 6, 2015 International Preliminary Report on Patentability issued in Application No. PCT/FI2013/051039.

* cited by examiner

METHOD FOR PRODUCING NANOFIBRILLAR CELLULOSE

FIELD OF THE INVENTION

The present invention relates to a method for preparing nanofibrillar cellulose. The invention also relates to nanofibrillar cellulose and applications using said nanofibrillar cellulose.

BACKGROUND OF THE INVENTION

Nanofibrillar cellulose refers to isolated cellulose microfibrils or microfibril bundles derived from cellulose raw material. Nanofibrillar cellulose (NFC), which is also known as microfibrillar cellulose (MFC), and by other related names, is a natural polymer that is abundant in nature. Generally, nanofibrillar cellulose has high aspect ratio and the fibril length can be up to several micrometers.

Traditionally, nanofibrillar cellulose production techniques are based on grinding (or homogenization) of aqueous dispersion of pulp fibers. The concentration of nanofibrillar cellulose in dispersions is typically low, usually around 1-5%.

The production of nanofibrillar cellulose by fibrillating cellulose fibers into nano-scale elements requires intensive mechanical treatment. In order to produce purified cellulose or reduce energy demand, chemical treatment or enzymatic treatment may be applied prior or posterior to mechanical fibrillation.

Through the mechanical fibrillating process, the fibrillated cellulose achieves a "gel-point" after repeated passes. The gel-point is characterized by a critical point in the process at which the cellulosic suspension rapidly thickens to a more viscous consistency. In other words, the viscosity of the pulp fiber suspension increases dramatically during the process. Therefore, after the grinding or homogenization process, the obtained nanofibrillar cellulose material is a dilute viscoelastic hydrogel.

However, for certain applications, a challenge associated with using NFC/MFC is the high viscosity in aqueous state, for example for pickering stabilization and coating processes, wherein low viscosity is desirable. Pickering stabilization means the utilization of nanometer scale solid particles in stabilization of heterogeneous systems, like emulsions and foams.

Japanese published patent application JP2009-298972 describes a method for producing cellulose fibers as a gas barrier film material, said method comprising the steps of oxidation, microparticulation, UV irradiation and enzymatic treatment. PCT publication WO 2012043103 describes cellulose nanofibers being able to form a film with excellent oxygen barrier properties, said nanofibers being produced by the steps of oxidation and enzymatic treatment followed by mechanical treatment. Both publications involve three or more steps.

European patent application EP 2226414 A1 describes a process for producing cellulose nanofibers using a 4-hydroxy TEMPO derivative less expensive than TEMPO and a process capable of rapidly producing homogeneous cellulose nanofibers.

PCT application WO 2012/119229 A1 describes highly charge group modified cellulose fibers and the method for making the same. The method comprises the steps of providing a raw material cellulose, producing dialdehyde cellulose in a first chemical process and converting the aldehyde groups into charge groups in a second chemical process.

PCT application WO 2011/064441 A1 describes a method for manufacturing nanofibrillated cellulose pulp. In the method, an optical brightening agent is dosed into the raw material before/during the pre-refining/refining stage as an refining additive.

PCT application WO 2012/107643 A2 describes a method for fabricating fiber and film products and composites. In the method, an aqueous gel of nanofibrillar cellulose is introduced into the process of fabricating fiber and film products.

Contrary to the typical high aspect ratio nanofibrillar cellulose, there is another type of nanocellulose with low aspect ratio, cellulose whiskers, which can be obtained by subjecting cellulose fibers to extensive acid hydrolysis, through which cellulose fibers undergo transverse cleavage along the amorphous region and turn into cellulose nanowhiskers with low aspect ratio, which leads to low viscosity. However, the production yield trough acid hydrolysis is typically only 50-60% due to solubilization of amorphous regions upon hydrolysis. Thus, the cellulose nanowhiskers are considered remarkably more expensive materials compared to NFC/MFC-like products.

Therefore, there is a need of easy-to-produce and cost-effective nanowhisker-like materials having low viscosity and still preserving desirable properties of fibril cellulose.

SUMMARY OF THE INVENTION

It is a purpose of the invention to provide a novel method for preparing nanofibrillar cellulose of low viscosity. The concept "low viscosity" means in this context the degree of viscosity close to what nanocrystalline cellulose/whiskers have.

In the method of the present invention, nanofibrillar cellulose is prepared by repeatedly passing fibrous dispersion of oxidized cellulose through a mechanical process of disrupting fibers into fibrils using a sufficient amount of energy until the viscosity starts to decrease. Herein "viscosity starts to decrease" means, while the viscosity of the pulp fiber suspension increases during the repeating disruptive process, the first sign of negative growth of the viscosity value, which can be obtained by measuring the nanofibrillar cellulose sample taken after each pass with a standard viscosity measurement method. The zero-shear viscosity value of nanofibrillar cellulose may decrease to the point below 10 Pa·s, preferably below 1 Pa·s, when measured by a rotational rheometer in the concentration of 0.5%. The zero-shear viscosity value is the value in the region of constant viscosity at small shear stresses. After the viscosity has been decreasing, the number average length of the nanofibrillar cellulose may be below 1 micrometer, preferably below 500 nm, while the number average diameter of the nanofibrillar cellulose remains essentially unchanged, in the range of 2 to 10 nm. The average aspect ratio of the nanofibrillar cellulose may be in the range of 80-300, preferably 100-250.

In another embodiment, the viscosity of the nanofibrillar cellulose measured with Brookfield viscometer at 10 rpm (Brookfield viscosity) is below 10000 mPa·s, preferably below 5000 mPa·s, and preferably not lower than 1000 mPa·s in the concentration of 0.8%.

It is another purpose of the invention to provide a novel use of nanofibrillar cellulose prepared by the method of the invention for pickering stabilization, especially for foam stabilization in various practical applications.

DESCRIPTION OF THE DRAWINGS

The invention will be explained in the following with reference to the appended drawings, where.

DETAILED DESCRIPTION OF THE INVENTION

Figure 1:
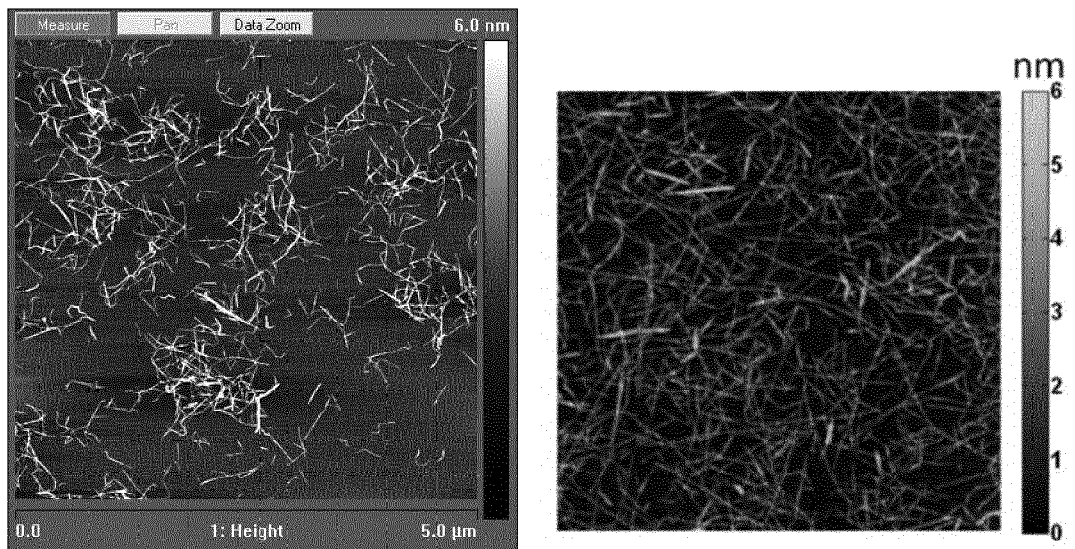
FIG. 1 shows AFM images of nanofibrillar cellulose.

The term "nanofibrillar cellulose" refers to a collection of isolated cellulose microfibrils or microfibril bundles derived from cellulose raw material. Microfibrils have typically high aspect ratio: the length might exceed one micrometer while the number-average diameter is typically below 200 nm. The diameter of microfibril bundles can also be larger but generally less than 1 micrometer. The smallest microfibrils are similar to so called elementary fibrils, which are typically 2-12 nm in diameter. The dimensions of the fibrils or fibril bundles are dependent on raw material and disintegration method. The nanofibrillar cellulose may also contain some hemicelluloses; the amount is dependent on the plant source. Mechanical disintegration of microfibrillar cellulose from cellulose raw material, cellulose pulp, or refined pulp is normally carried out with suitable equipment such as a refiner, grinder, homogenizer, colloider, friction grinder, ultrasound sonicator, fluidizer such as microfluidizer, macrofluidizer or fluidizer-type homogenizer. In this case the nanofibrillar cellulose is obtained through disintegration of plant cellulose material and can also be called "nanofibrillated cellulose".

Thus, nanofibrillar cellulose has typically a high aspect ratio: the length might exceed one micrometer while the number-average diameter is typically below 200 nm. Now a unique combination of chemical modification and mechanical disruptive treatment to diminish length of the NFC was found. This new grade of nanofibrillar cellulose has lower aspect ratio and higher surface area than typical fibril cellulose. The lower aspect ratio leads to lower viscosity of the dispersion in water; which is beneficial in certain applications, such as pickering stabilization and coating processes.

The surface of original, chemically unmodified cellulose in the fibrous starting material is charged ionicaliy in a chemical pretreatment before the mechanical disruptive treatment. In this way the internal bonds in the cellulose between the microfibrils is weakened, and it is thus possible to enhance the separation of nanofibrils. Some methods for charging the cellulose can be given as example. Oxidation pretreatment of cellulose before the mechanical disruptive treatment is a promising method for surface modification of native cellulose, by which carboxylate and aldehyde functional groups can be introduced into solid native cellulose under aqueous and mild conditions. When native cellulose is used, the oxidation occurs at the surface of the microfibrils, which become negatively (anionically) charged and subsequently results in repulsion of the nanofibers, thus easing fibrillation. Cellulose obtained through N-oxyl mediated catalytic oxidation (e.g. through 2,2,6,6-tetramethyl-1-piperidine N-oxide, known by abbreviation "TEMPO") or carboxymethylated cellulose are examples of anionically charged nanofibrillar cellulose where the anionic charge is due to a dissociated carboxylic acid moiety. Cellulose derivative where the cellulose contains quaternary ammonium groups is an example of canonically charged nanofibrillar cellulose.

According to one embodiment of the method, primary alcohols of cellulose are oxidized to aldehydes and carboxylic acids through N-oxyl mediated catalytic oxidation, for example through TEMPO, by using sodium hypochlorite as the main oxidant. Regarding the finding that low degree of oxidation does not allow efficient enough fibrillation and higher degree of oxidation inflicts degradation of cellulose after mechanical disruptive treatment, the carboxylate content of the oxidized cellulose may be at least 0.75 mmol COOH/g pulp, preferably 0.8-1.2 mmol COOH/g pulp, most preferably 0.9-1.1 mmol COOH/g pulp.

The catalytic oxidation does not change the crystalline structure of the cellulose, but the crystalline structure remains "cellulose I" also in the oxidized cellulose.

Then, the oxidized cellulose is subjected to a mechanical process of fibrillating. According to one embodiment of the method, the mechanical process of fibrillating is conducted in a high pressure homogenizer, and according to another embodiment, a fluidizer is used. The energy taken by the fibrillating work is normally expressed in terms of energy per processed material quantity, in units of e.g. kWh/kg, MWh/ton, or units proportional to these. In order to reach sufficient fibrillation level as well as desired viscosity, at least 2 MWh/t (dry pulp) may be required. According to still another embodiment of the method, fibrillation is performed in low concentration (1-4%) aqueous dispersion. In this context, fibrillating means disintegrating the fibers to microfibrils, not to be confused with the method where fibrils are only made to protrude from the surface of the pulp fibers.

Fluidizers and homogenizers are known in fibrillating fibrous dispersions into microfibrils, and the process is based on the use of high pressure and shear forces at high speeds when the dispersion is forced through a small gap. Fluidizers of microfluidics and homogenizers of GEA can be mentioned as two examples.

The invention is not limited to catalytically oxidized nanofibrillar cellulose, but carboxymethylated and cationically charged nanofibrillar cellulose can be used as well, if the pretreatment is performed carefully enough so that the crystalline structure of the cellulose is not altered and it is "cellulose I" also in the chemically modified form.

As shown in FIG. 1, the left image is an AFM (atomic force microscopy) image of nanofibrillar cellulose with low aspect ratio (low aspect ratio nanofibrillar cellulose, "NFC-L") according to one embodiment of the method. The image area is 5 micrometers. The right image is an AFM image of oxidized cellulose with higher aspect ratio. The image area is 2 micrometers (μm).

The sample in FIG. 1 was obtained from catalytically oxidized cellulose having 1.02 mmol COOH/g oxidized pulp, which was made to nanofibrillar cellulose by a fluidizer. Compared with the previously known cellulose whiskers, made by acid hydrolysis, the low aspect ratio nanofibrillar cellulose (NFC-L) is longer and has more bent shape, while it is shorter than the nanofibrillar cellulose that is conventionally made to achieve high viscosity. This is believed to be related to the presence of the amorphous regions of cellulose next to the crystalline regions of cellulose in the fibrils, which amorphous regions were conserved during the treatment. Thus, the method where chemical pretreatment is combined with mechanical treatment, which is allowed to proceed far enough beyond the highest value of viscosity, yields an aqueous dispersion of new grade of nanofibrillar cellulose which, in addition to novel rheological properties expressed as viscosity values, also shows novel morphology of the microfibrils.

Figure 2:
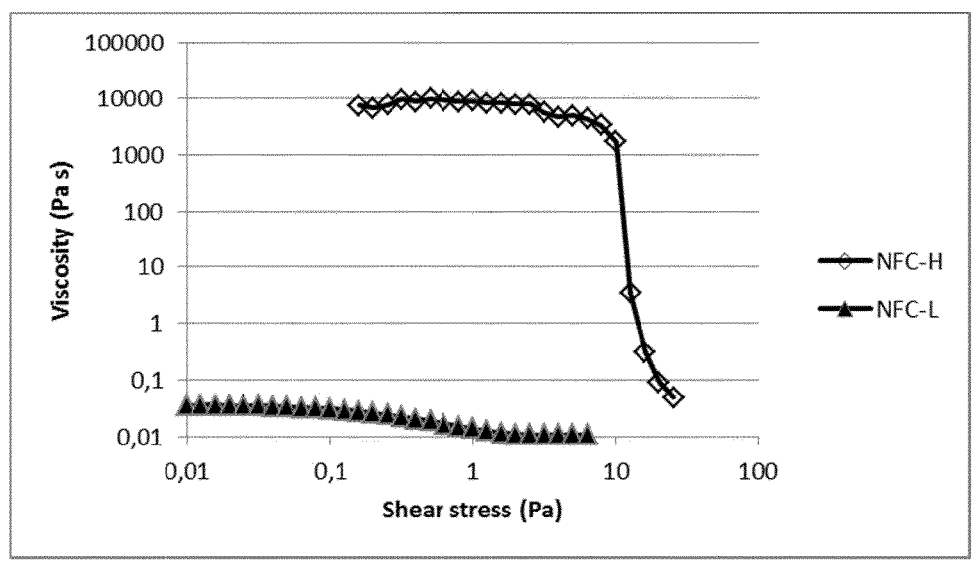
FIG. 2 shows flow profiles of different nanofibrillar cellulose grades.

FIG. 2 shows flow profiles (viscosity vs. shear stress) of 0.5% aqueous dispersions of high aspect ratio nanofibrillar cellulose (NFC-H) and low aspect ratio nanofibrillar cellulose (NFC-L). Sample NFC-H is TEMPO-oxidized cellulose with high aspect ratio, leading to high viscosity. Sample NFC-L is the "whisker-like" nanofibrillar cellulose with low aspect ratio, leading to low viscosity.

Samples of the obtained low-aspect ratio nanofibrillar cellulose were also pre-ground, followed by fibrillation in Microfluidics Fluidizer M-7250, once trough APM+200 μm prechambers and 7 times through APM+100 μm chambers. The zero-shear viscosity measured by a rotational rheometer is the viscosity value of aqueous 0.5 wt-% nanofibrillar cellulose dispersion in a region of constant viscosity at small shear stresses when the shear stresses approach zero. It can be seen that in the curves, the zero shear viscosity is below 10 Pa·s and even below 1 Pa·s for a 0.5 wt-% aqueous dispersion of NFC-L.

Figure 3:
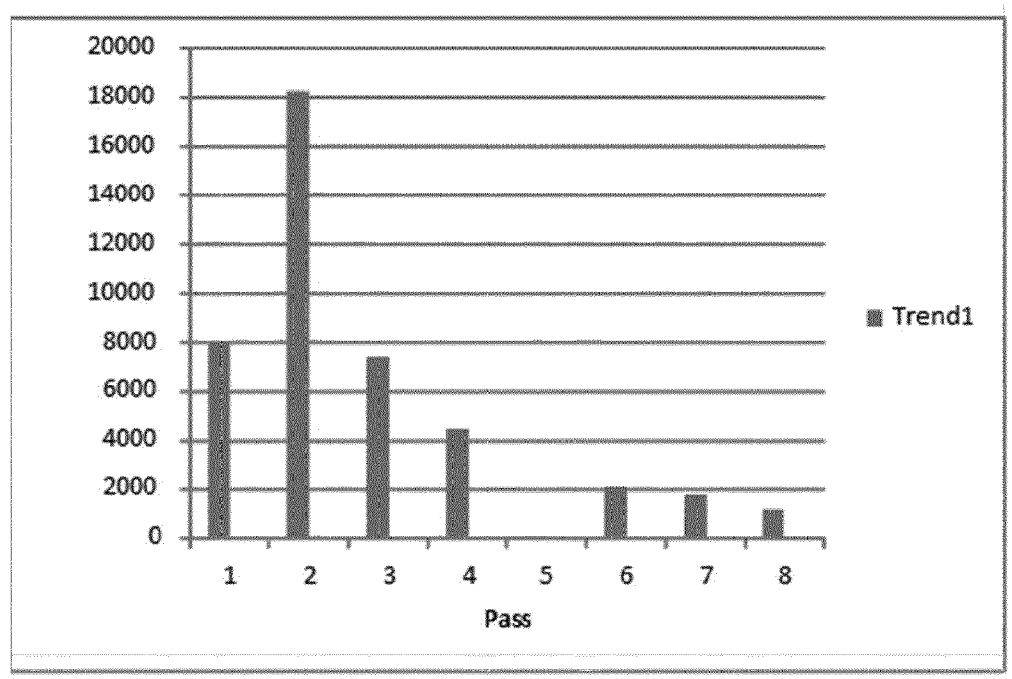
FIG. 3 shows the viscosity change of nanofibrillar cellulose along with the number of passes.

The apparent viscosity of NFC is measured with a Brookfield viscometer (Brookfield viscosity) or another corresponding apparatus. Suitably a vane spindle (number 73) is used. There are several commercial Brookfield viscometers available for measuring apparent viscosity, which all are based on the same principle. Suitably RVDV spring (Brookfield RVDV-III) is used in the apparatus. As a result, a viscosity graph is obtained with varying shear rate. A low rotational speed 10 rpm is suitable. FIG. 3 shows the viscosity change of nanofibrillar cellulose along with the number of passes (cycles), and columns "Trend 1" shows the measurements measured immediately after fluidization, the NFC sample being diluted in water with agitation to a concentration 0.8 wt-% for the measurement. As can be seen in the figure, the Brookfield viscosity at 10 rpm increased dramatically up to 18,000 mPa·s after the second pass, and after the third pass, the viscosity value is clearly inversely proportional to the number of passes. The mechanical treatment is preferably continued until the Brookfield viscosity is below 5000 mPa·s, which is attained after the 4$^{th}$ pass in FIG. 3. The treatment is preferably discontinued before the Brookfield viscosity drops below 1000 mPa·s (measured at 0.8 wt-%).

Turbidity may be measured quantitatively using optical turbidity measuring instruments. There are several commercial turbidometers available for measuring quantitatively turbidity. In the present case the method based on nephelometry is used. The units of turbidity from a calibrated nephelometer are called Nephelometric Turbidity Units (NTU). The measuring apparatus (turbidometer) is calibrated and controlled with standard calibration samples, followed by measuring of the turbidity of the diluted NFC sample.

In the method, a nanofibrillar cellulose sample is diluted within a liquid, preferably in water, to a concentration below the gel point of said nanofibrillar cellulose, and turbidity of the diluted sample is measured. Said concentration where the turbidity of the nanofibrillar cellulose samples is measured is 0.1%. The mean value and standard deviation are calculated from the obtained results, and the final result is given as NTU units. The novel low-aspect ratio grade has typically the turbidity below 10 NTU in the above-mentioned measuring conditions.

Figure 4:
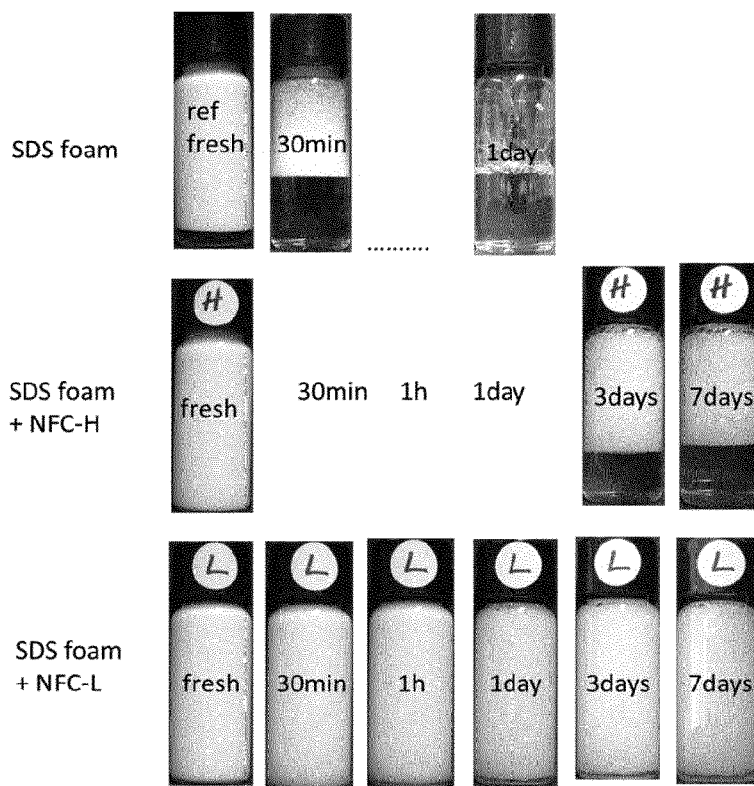
FIG. 4 shows the pickering stabilization ability of nanofibrillar cellulose according to one embodiment.

FIG. 4 shows the pickering stabilization ability of nanofibrillar cellulose according to one embodiment. 1% SDS surfactant was used to create foam in both experimental group and control group, and in the experimental group 0.5% of nanofibrillar cellulose was also used. Materials were mixed with ultraturrax to create the foams. Both the high-aspect ratio nanofibrillar cellulose (NFC-H) and novel low-aspect ratio oxidized nanofibrillar cellulose (NFC-L) was used. Highest row represents the control foam made only from water and air with 1% SDS, middle row describes the 0.5% NFC-H sample, and the lowest row represents the 0.5% NFC-L sample. As can be seen in the figure, the nanofibrillar cellulose made by the method (NFC-L) performed excellently in pickering stability of foam.

Figure 5:
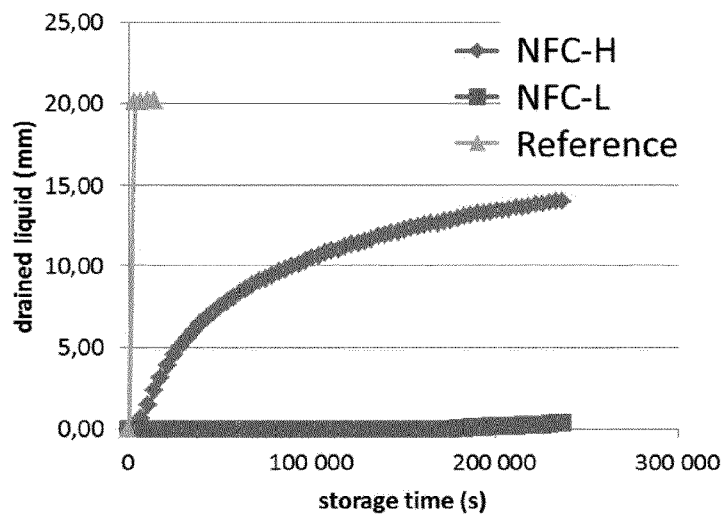
FIG. 5 shows the pickering stabilization ability in numerical values.

The results of the same sample foams are described in the curve of FIG. 5 as the amount of drained water vs. storage time. The drained liquid was measured from the top fraction of the foams placed in the vials with a Turbiscan device.

From FIGS. 4 and 5 it is clear that the low aspect ratio oxidized nanofibrillar cellulose is extremely efficient stabilizer of foams against coalescence upon aging. As FIG. 4 visualizes the foam structures as a function of time for the three model foams, FIG. 5 shows the kinetics of the bubble coalescence and water bleeding. Foam stabilized with NFC-L is stabile several days, while the control foam collapses within minutes and in the foam stabilized with NFC-H the water bleedin starts gradually.

Figure 6:
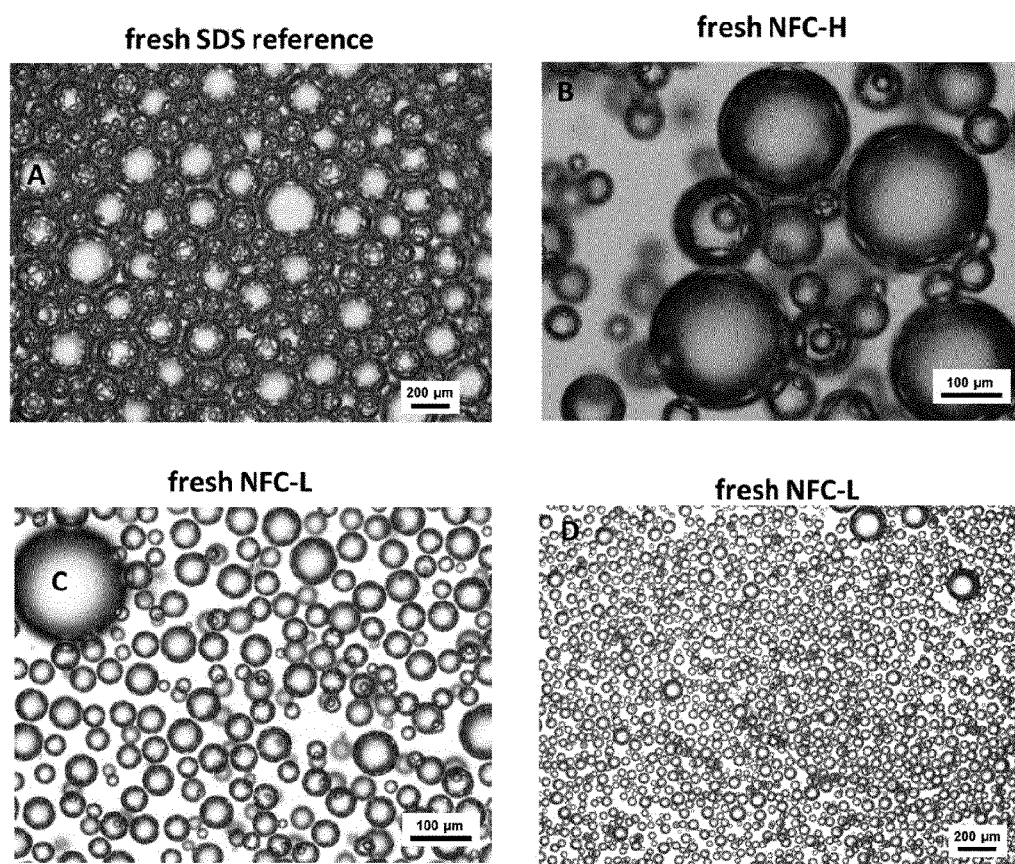
FIG. 6 shows the structure of the foams in more detail.

FIG. 6 shows photographs of three fresh model foam systems made in accordance with the description above. A in the upper left corner is the reference foam, scale bar 200 micrometers, B in the upper right corner is the foam with NFC-H, scale bar 100 micrometers, C in the lower left corner is foam with NFC-L, scale bar 100 micrometers, and D on the lower right corner is the same foam with NFC-L, scale bar 200 micrometers.

The foam structures are clearly different for the three model foams. In the reference SDS foam (1% SDS, air, and water mixed with ultraturrax), the bubbles are closely packed and partially started to coalesce. The bubble diameters are between 100 to 200 micrometers. In the model foam with 1% SDS and 0.5% high aspect ratio NFC (NFC-H), the bubbles are slightly smaller and not as tightly packed. In the model foam with 1% SDS and 0.5% low aspect ratio NFC (NFC-L), the bubbles are clearly much smaller, typically 20 to 50 micrometers and well distributed over the whole volume. The bubbles are also well separated without coalescence.

Figure 7:
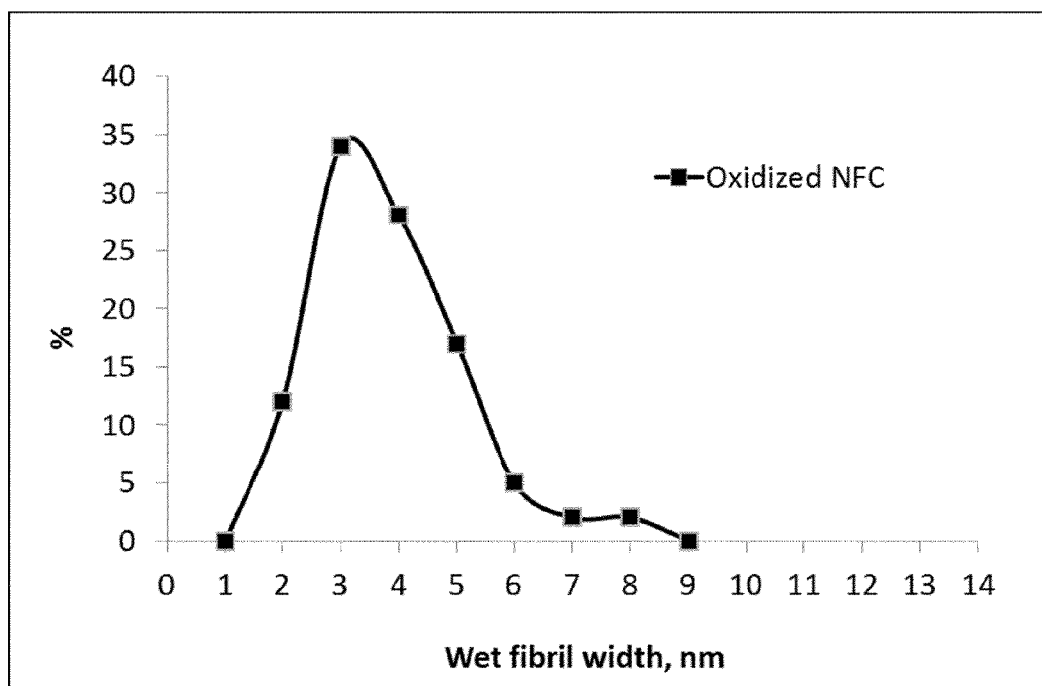
FIG. 7 shows the width distribution of oxidized low-aspect ratio NFC.

FIG. 7 illustrates the width distribution of oxidized low-aspect ratio NFC, (NFC-L) measured from cryo-TEM image. The continued mechanical disruptive action beyound the peak viscosity values is found to make the fibrils shorter without essential effect on the diameter of the microfibrils, which is also exemplified by the diagram. The number average fibril width is between 2 and 6 nm, while the whole distribution is within the range of 1 to 10 nm.

The novel low-aspect ratio nanofibrillar cellulose has many potential uses, one of which is the pickering stability of heterogeneous systems comprising two immiscible phases which form a dispersion. The nanofibrillar cellulose can be used especially in foam stabilization in oil drilling, foam explosives, or in a so-called foam forming technology.

In foam forming, air is mixed to water-based fiber furnish containing structural fibers (such as papermaking fibers) surfactant, and nanofibrillar cellulose as foam stabilisator. The obtained composition is used for forming fibrous sheet-like products, such as mainly porous, smooth and light-weight paper products. However, the applications of the low-aspect ratio nanofibrillar cellulose are not limited to the stabilization of the above-mentioned compositions and to the stabilization of the heteregeneous systems in general. The NFC can also be used in other fields where its morphology and/or rheological properties can be utilized.

The invention claimed is:

1. A method for preparing nanofibrillar cellulose, comprising:
  repeatedly passing fibrous dispersion of ionically charged cellulose through a mechanical process of disrupting fibers into fibrils until viscosity of the fibrous dispersion starts to decrease, wherein after the mechanical process the nanofibrillar cellulose has a number average diameter in the range of 2-10 nm, and a zero-shear viscosity below 10 Pa·s, when measured in a nanofibrillar cellulose concentration of 0.5 wt-%.

2. The method according to claim 1, wherein the nanofibrillar cellulose has crystalline structure being cellulose I.

3. The method according to claim 1, wherein the nanofibrillar cellulose has amorphous regions.

4. The method according to claim 1, wherein the nanofibrillar cellulose has a number average length below 1 micrometer.

5. The method according to claim 1, wherein the nanofibrillar cellulose has an average aspect ratio in the range of 80-300.

6. The method according to claim 1, wherein the method further comprises oxidizing cellulose through N-oxyl mediated catalytic oxidation to obtain oxidized cellulose.

7. The method according to claim 6, wherein the oxidized cellulose has a carboxylate content of at least 0.75 mmol COOH/g pulp.

8. The method according to claim 1, wherein the mechanical process of disrupting fibers into fibrils is performed by passing fibrous dispersion through a high pressure homogenizer or fluidizer.

9. The method according to claim 1, wherein the zero-shear viscosity of the nanofibrillar cellulose is below 1 Pa·s, when measured in the nanofibrillar cellulose concentration of 0.5 wt-%.

10. The method according to claim 9, wherein the nanofibrillar cellulose has crystalline structure being cellulose I.

11. The method according to claim 9, wherein the nanofibrillar cellulose has amorphous regions.

12. The method according to claim 10, wherein the nanofibrillar cellulose has amorphous regions.

13. The method according to claim 1, wherein the nanofibrillar cellulose has a number average length below 500 nm.

14. The method according to claim 1, wherein the nanofibrillar cellulose has an average aspect ratio in the range of 100-250.

15. The method according to claim 6, wherein the oxidized cellulose has a carboxylate content of 0.8-1.2 mmol COOH/g pulp.

16. The method according to claim 6, wherein the oxidized cellulose has a carboxylate content of 0.9-1.1 mmol COOH/g pulp.

17. The method according to claim 9, wherein the nanofibrillar cellulose has a number average length below 1 micrometer.

18. The method according to claim 9, wherein the nanofibrillar cellulose has a number average length below 500 nm.

19. The method according to claim 9, wherein the nanofibrillar cellulose has an average aspect ratio in the range of 80-300 nm.

20. The method according to claim 9, wherein the nanofibrillar cellulose has an average aspect ratio in the range of 100-250.

21. The method according to claim 9, wherein the method further comprises oxidizing cellulose through N-oxyl mediated catalytic oxidation to obtain oxidized cellulose.

22. The method according to claim 21, wherein the oxidized cellulose has a carboxylate content of at least 0.75 mmol COOH/g pulp.

23. The method according to claim 21, wherein the oxidized cellulose has a carboxylate content of 0.8-1.2 mmol COOH/g pulp.

24. The method according to claim 21, wherein the oxidized cellulose has a carboxylate content of 0.9-1.1 mmol COOH/g pulp.

25. The method according to claim 9, wherein the mechanical process of disrupting fibers into fibrils is performed by passing fibrous dispersion through a high pressure homogenizer or fluidizer.

26. Nanofibrillar cellulose obtainable by the method for preparing nanofibrillar cellulose according to claim 1, wherein the nanofibrillar cellulose has a number average diameter in the range of 2-10 nm, and a zero-shear viscosity below 1 Pa·s, when measured in a nanofibrillar cellulose concentration of 0.5 wt-%.

27. The nanofibrillar cellulose according to claim 26, wherein the nanofibrillar cellulose has crystalline structure being cellulose I.

28. The nanofibrillar cellulose according to claim 26, wherein the nanofibrillar cellulose has amorphous regions.

29. A method of using nanofibrillar cellulose comprising:
  providing nanofibrillar cellulose having a number average diameter in the range of 2-10 nm, and a zero-shear viscosity below 1 Pa·s, when measured in a nanofibrillar cellulose concentration of 0.5 wt-%, and
  using the nanofibrillar cellulose in pickering stabilization.

30. The method according to claim 29, wherein the nanofibrillar cellulose is used in foam stabilization.

31. The method according to claim 30, wherein the nanofibrillar cellulose is used in foam forming for making fibrous sheet-like products.

32. The method according to claim 29, wherein the nanofibrillar cellulose has crystalline structure being cellulose I.

33. The method according to claim 29, wherein the nanofibrillar cellulose has amorphous regions.

34. The method according to claim 32, wherein the nanofibrillar cellulose has amorphous regions.

* * * * *